Nov. 11, 1924.

E. E. RICHARDSON 1,514,630

ENGINE VALVE

Filed March 12, 1920    2 Sheets-Sheet 1

Edward E. Richardson
INVENTOR.

BY Richey, Slough & Fables
HIS ATTORNEYS

Nov. 11, 1924.
E. E. RICHARDSON
1,514,630
ENGINE VALVE
Filed March 12, 1920   2 Sheets-Sheet 2
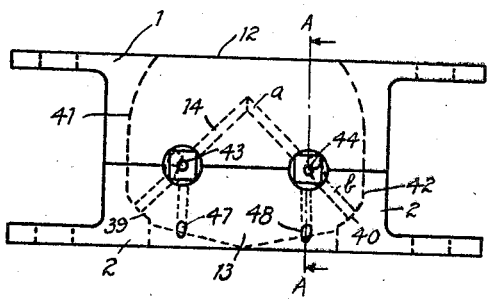
Fig-1-A
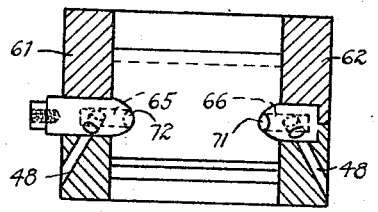
Fig-2-A
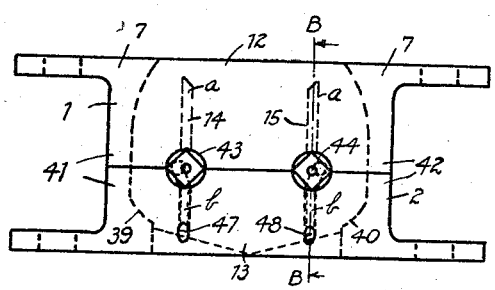
Fig-3-A
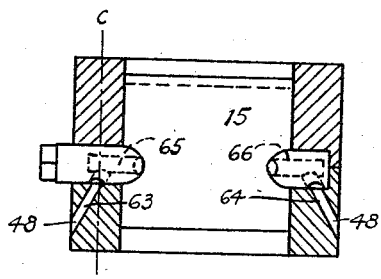
Fig-4-A
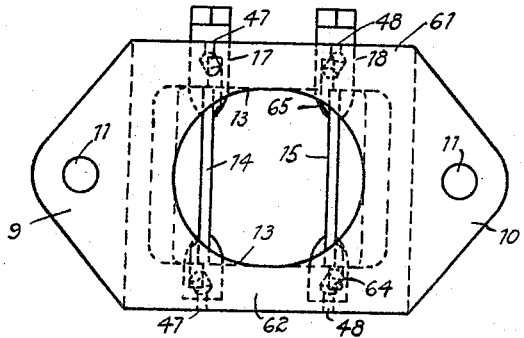
Fig-5-A
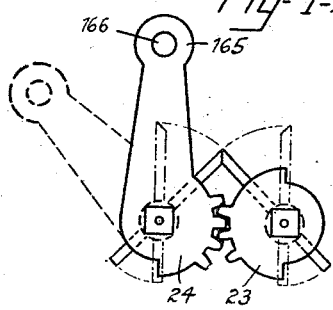
Fig-6-A
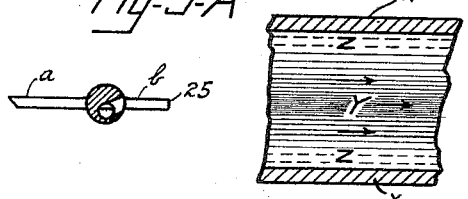
Fig-7-A
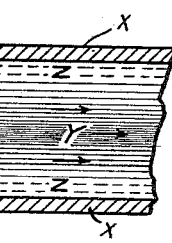
Fig-8-A
Edward E. Richardson
INVENTOR
BY Richey, Slough & Falk
HIS ATTORNEYS Patented Nov. 11, 1924.

1,514,630

UNITED STATES PATENT OFFICE.

EDWARD E. RICHARDSON, OF MAUMEE, OHIO, ASSIGNOR TO THE R & S NON-DEFLECTING VALVE COMPANY, OF ELYRIA, OHIO, A CORPORATION OF OHIO.

ENGINE VALVE.

Application filed March 12, 1920. Serial No. 365,149.

*To all whom it may concern:*

Be it known that I, EDWARD E. RICHARDSON, a citizen of the United States, and a resident of Maumee, in the county of Lucas and State of Ohio, have invented certain new and useful Improvements in Engine Valves; and I do hereby declare the following to be a full, clear, and exact description of the invention, such as will enable others skilled in the art to which it appertains to make and use the same.

This invention relates to throttle or governing valves for engines of various types, but it is particularly adapted to explosion engines. Throttle valves for explosion engines consist, generally, of circular vanes inside a casing having a circular passage. When the vane or butterfly valve is rotated to the open position, the gas or fuel mixture passes along both sides of the vane in substantially equal volume. Two streams of gas, therefore, are directed past the valve and these flow along the side walls and encounter a maximum amount of frictional resistance. The velocity of the gas stream is, therefore, reduced and condensation on the passage walls takes place to a considerable extent. This type of valve is not all that could be desired for any kind of throttle control of gas engines, and it is especially unsatisfactory for the so-called "governor" control, where a speed governor is used to throttle the gas, in addition to the usual hand control, as the two controls cause an excessive amount of condensation. For this reason, a great deal of trouble has been experienced with governor control of gas engine throttles.

It is the object of my invention to overcome these disadvantages, as well as others referred to in the following description, reference being had to the drawings, in which.

Figure 1:
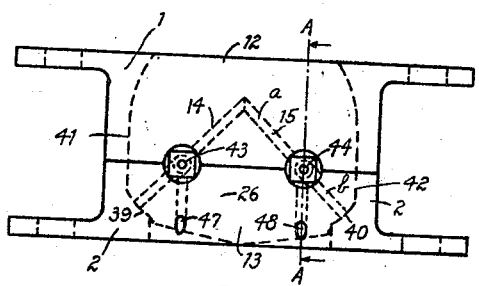
Fig. 1 is a side view of a valve casing containing my improvements showing in dotted lines some of the internal working parts, disposed in normal, inoperative position.
Figure 2:
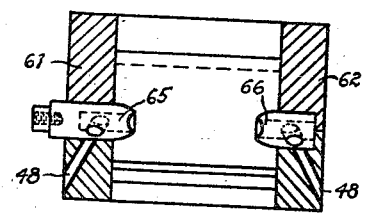
Fig. 2 is a sectional plan taken on the line A—A of Fig. 1.
Figure 3:
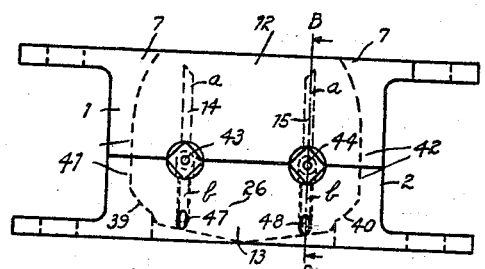
Fig. 3 is a side view of the casing showing in dotted lines the working parts in fully operative advanced position.

Figs. 1<sup>A</sup> to 8<sup>A</sup> inclusive are different views of a modified form of my invention, the different views of this second embodiment corresponding to the views for the first embodiment shown in Figs. 1 to 8, respectively.

Referring to the drawings, the valve consists preferably of two parts 1 and 2 having a chamber of rectangular cross-section. The two sections are secured together in any suitable way. The sections 1 and 2 have standard size couplings 9 and 10 for attaching to the cylinder block of the engine and to the carburetor, or to any other desired part of the engine. Suitable holes 11 are made in the fittings 9 and 10 to permit the valve to be clamped in position.

I have shown the couplings with lugs or ears through which connecting bolts are adapted to pass. These bolts extend not only through the connections 9 and 10, but also through the flanges of the carburetor and intake pipe, or other part of the engine to which they are clamped. In this way the bolts hold the sections 1 and 2 tightly together in addition to clamping the valve casing to the engine parts. The openings 12 and 13 in the valve sections may be of any desired shape, but preferably they are made circular, as shown, since this is the general section of passageway in standard engine and carburetor fittings. Fillets 7 may be used to cause the rectangular chamber 26 to merge into the circular openings.

Figure 4:
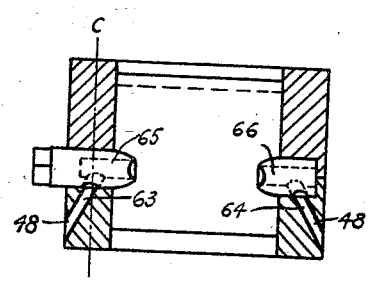
Fig. 4 is a sectional plan view taken on the line B—B of Fig. 3.
Figure 5:
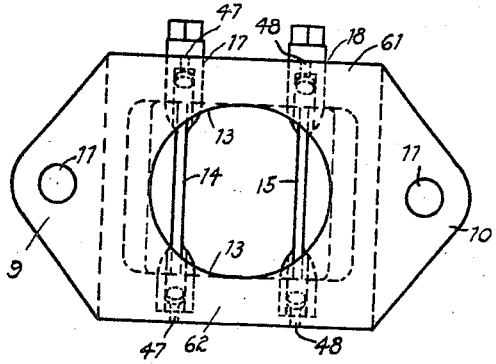
Fig. 5 is an end view of the valve casing and parts with unexposed portions shown in dotted lines.
Figure 6:
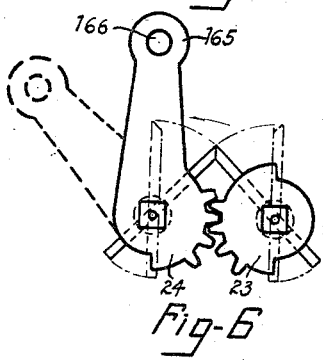
Fig. 6 shows the differential shutter operating mechanism.
Figure 7:
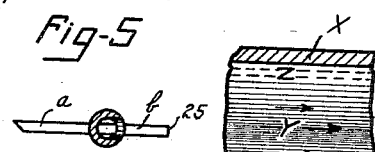
Fig. 7 is an end view of one of the shutter journals, being shown in section to expose an air-vent channel therein.

Inside the valve casing are journaled two vanes or shutters 14, 15 and for ease of assembly, I prefer to make the bearings by drilling out holes 17, 18, 20, and 21 in the two blocks along their line of junction, the bearings being shown more clearly in Fig. 4. The journals or bearings of the shutters are secured to pinion members 23, 24, one of which, 24, operates the other.

The casing member 2 has seat members 39 and 40 on its side walls, 41, 42 and the seating surfaces on these are preferably concentric with the axes 43, 44 of the shutters. The shutters have curved bottom portions 25, preferably made concentric with the axes referred to, and the arrangement is such that these make a snug moving fit with the seating surface on the side wall projections.

It would naturally be supposed that the axes 43, 44 should be in the center of the shutters, in order to produce balancing and easy movement. However, in my experiments, I have discovered that this is not the case, as the shutters would be held tightly closed under engine suction, and a considerable force required to open them. To overcome the tendency of the shutter to stay in closed position when in operation, I make the upper wings *a*, thereof, longer than the bottom wings *b*, that is, the lengths projected on the plane passing through the axes 43, 44. If, however, the wings are, in this way, so proportioned as to be equally affected by the suction, the shutters tend to chatter; also, fail to follow instantly the movements of the governor or throttle lever, since there is generally a certain amount of back-lash of the gear teeth and play in the throttle or governor connections. Therefore, to avoid these disadvantages, I make the leading wing *a* enough longer than the trailing wing *b* to always bias the shutters to the open position through the engine suction. The shutters, therefore, follow the movement of the governor or throttle lever, and open as far as permitted. Chattering is, therefore, eliminated, and the shutters instantly respond to the backward and forward movements of the governor or throttle lever.

In order to pass the major portion of the fuel mixture through the center of the passageway, the seat members 39 and 40 project sufficiently inwardly from the side walls 41 and 42 to permit the top wings *a* to have considerable movement from the closed position before the bottom wings *b* leave the valve seats. With this construction the gas will pass entirely between the upper wings of the shutters, as shown by the full line arrow, for a considerable range of speed of the engine, which is very desirable, as in the lower engine speeds condensation will be very materially reduced.

It is an advantage to introduce uncarbureted air into gasoline engine intakes at the higher speeds, and my improved construction provides for this in such a way that added "raw" air, moving at high velocity, surrounds the inrushing carbureted mixture and prevents, to a very considerable degree, actual contact between the carbureted mixture and the vanes and the manifold walls. Friction is thereby reduced, and the velocity of the mixture flow is not decreased, as with prior constructions. Thus condensation is greatly reduced and in some cases, practically eliminated. This I accomplish, in the embodiment of my invention illustrated in Figs. 1 to 8 inclusive, by arranging air passages 65, 66 in the end bearings for the vanes, which air passages are purposely made of larger diameter than the supported vanes, to make, in effect, of these end bearings, air distributing nozzles, each having a pair of half-moon shaped openings, one disposed on each side of the vanes.

The other end of each passage opens on one side only of the shaft to join a co-operating passage, as 63 and as 64, in a side wall. In each of the two side walls 61 and 62 are two such passages, adapted to open into co-operating passages in the shutter shafts, wherever the shutters are rotated on such bearings to a predetermined degree; also, the area of the opening between the two sets of passages depends on the extent of the bearing rotation, so that the amount of raw air admitted depends upon the amount of shutter opening.

The ends of the upper wings *a* of the vanes 14 and 15 are preferably beveled, though, of course, they may be rounded or otherwise, as desired, and the seating surfaces 39, 40 are so arranged that there will be sufficient space for movement of the lower or trailing wings *b* of the shutters to insure that the beveled surfaces on the upper wings of the shutters can be brought into contact with each other. However, it is not always desirable to completely close the throttle valve of a gas engine, and, of course, whenever desired, the valves can be adjusted to a minimum closed position by suitable stops.

The pinion 24 contains a handle extension member 165 having its end perforated at 166, for the purpose of connecting the pinion 24 to a suitable valve operating means, such as a hand-throttle or the like. Inasmuch as the shutters of my invention require very little force to move them in either direction, even under conditions of considerable gas flow, or suction created by the engine operation, a suitable valve controlling governor may be connected to the lever arm 165 to control the operation of the valve shutters, without being opposed to any undesirable extent by the forces acting directly on the shutters.

Figure 8:
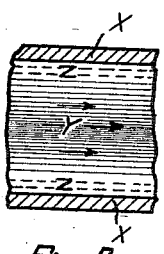
Fig. 8 is a rough illustration of the gas flows which may be secured by the use of the valve of my invention.

When the shutters are sufficiently opened to join the passages 63 and 64 of the casing with the passages 65—66 of the vane bearings, raw air will be admitted through the vents 47 and 48 of the casing, and this will be applied at either side of the mixture which is rushing through the valve at this time, and will practically isolate the mixture flow Y from the manifold walls X (Fig. 8), the flow of raw air being largely disposed substantially as illustrated in Fig. 8 at Z.

Of course, there is some mixing of the currents, as the gas flows proceed further into the manifold, but since nowadays the gasoline source of the mixture is usually preheated, such mixing may only produce what is known as a "fog" effect, a fog being formed between the layer of raw air and the mixture, but the mixture and the fog are both swept along through the manifold, isolated by a layer of air from the manifold walls, into the engine cylinders, with very little, and in some cases, no undesirable condensation of the mixture upon the manifold walls, as is prevalent with the use of other valves, to cause "loading", so-called.

It will be noted that each of the nozzle openings for a bearing passageway, as for instance, the bearing passageway 66, and a portion of the bearing passageway itself, forms a by-pass for the flow of mixture to a very limited degree, which may be predetermined around the valve vanes, so that the vanes, even when in closed position, cannot completely cut off the flow of gas mixture to the engine. This arrangement is useful where it is desired to admit enough mixture to barely keep the engine running, even though the valve operating mechanism may have operated to move the vanes to completely closed position.

Referring to Figs. 1ᴬ to 8ᴬ inclusive, I show therein a different embodiment of my invention, whereby I provide only one opening for each bearing passageway. Thus the shaft passageway 66 will have a single opening 71 disposed on one side of the vane, and on the other side of the vane the bearing passage 65 will terminate in an opening 72. By arranging only a single opening for each bearing passage, and arranging one shaft passage to open on one side of the vane and the other on the opposite side, I still isolate the vane from the mixture by admitted raw air, on certain predetermined shutter openings, but I do not thereby provide, as in Figs. 1 to 8 inclusive, an arrangement whereby when the shutters are completely closed a by-pass may be provided for "idling" purposes, as for the purpose of keeping the engine running, even though the valves be closed. In the arrangement of Figs. 1ᴬ to 8ᴬ inclusive, the admission of the mixture to the engine will be completely cut off, as is sometimes desirable.

My improved form of throttle valve has been found to be especially suited for explosion engines, as there is substantially no skin friction against the valve vanes. Condensation is, therefore, materially reduced, or entirely eliminated, in the neighborhood of the valves. Consequently, superior results are obtained. Chattering is also eliminated, and movement of the control lever backward or forward will produce, instantly, similar movements of the shutters.

In the foregoing description, it is presumed that some kind of a mixing device, such as a carburetor, will be connected ahead of the valve, to supply an air-gas mixture to the valve, and it is furthermore presumed that the valve is located intermediate of this mixing device and a gas explosive engine. The carburetor or the governor thereof and the engine may be of any of the well known types, such as will operate properly in connection with a valve structure, as herein described.

While I have shown particular embodiments of my invention, it will be apparent that various other changes and modifications may be made, without departing from the spirit of the invention.

Having described my invention, what I claim is:

1. In engine valves, the combination with a casing having a longitudinal passageway, a pair of shutters mounted in the said passageway on bearings extending laterally thereof, the said shutters being adapted when rotated to one extreme position to entirely close the passageway and when rotated to an opposite extreme position to open the passageway to obstruct or permit the flow of a gas mixture therethrough, said bearings having auxiliary passages to admit an auxiliary flow of air into the passageway when the said shutters are rotated to more than a predetermined open position.

2. In valves for explosive engines, the combination of the valve casing having a passageway therethrough, and a pair of shutters mounted in the passageway in said casing and adapted to be operated to restrict the flow of gas mixture through said casing, said casing having by-pass openings to admit raw air into the passageway on predetermined shutter adjustments, said organization of elements being such that the gas flow from the passageway may be enveloped by a thin wall of raw air admitted through the said opening.

3. In a valve for explosive engines, the combination with a casing having a main passageway and a plurality of by-pass openings leading thereto from the outside of the said casing, a pair of shutters mounted in the said passageway, each of said by-pass openings terminating on the interior of the casing in a nozzle so arranged as to always direct the inflowing air from the by-pass openings on either side of a shutter, so that the mixture will be isolated from the surface of the shutter by the inrushing flow of air from the said nozzle.

In witness whereof, I have hereunto signed my name this 8 day of March, 1920.

EDWARD E. RICHARDSON.